(12) United States Patent
Yano

(10) Patent No.: US 6,512,209 B1
(45) Date of Patent: Jan. 28, 2003

(54) TEMPERATURE CONTROL APPARATUS, TEMPERATURE CONTROL METHOD AND DEVICE

(75) Inventor: Shinsuke Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/983,369

(22) Filed: Oct. 24, 2001

(30) Foreign Application Priority Data

Sep. 7, 2001 (JP) ........................................ 2001-207248

(51) Int. Cl.[7] ................................................ H05B 1/02
(52) U.S. Cl. .................... 219/497; 219/494; 236/1 C
(58) Field of Search ................................ 219/497, 499, 219/494, 501, 505, 508, 483; 236/1 C

(56) References Cited

U.S. PATENT DOCUMENTS 4,191,875 A * 3/1980 Cunningham ............ 219/494
5,566,062 A * 10/1996 Quisenberry et al. ......... 363/89
5,688,422 A * 11/1997 Landwehr et al. ............ 219/491

FOREIGN PATENT DOCUMENTS

JP 9-305268 11/1997
JP 2000-36681 2/2000

* cited by examiner

Primary Examiner—Mark Paschall
(74) Attorney, Agent, or Firm—Staas & Halsey LLP

(57) ABSTRACT

A temperature control apparatus, a temperature control method and a device are provided in which the problem of a variation in the operation speed of each device can be alleviated to improve the operation speed of the entire system and reduce failures such as racing, etc., as well as the problem of manufacturing yield for improved reliability in operation, thus contributing to power reduction in temperature control. To this end, a target operating temperature determined based on a target operation speed of each LSI 2 is stored in a ROM 22, and a Peltier element 3 mounted on each LSI 2 is cooled or heated so that the temperature of each LSI2 detected by a temperature detecting section 21 is controlled to a target operating temperature stored in the ROM 22.

15 Claims, 7 Drawing Sheets

TEMPERATURE CONTROL APPARATUS, TEMPERATURE CONTROL METHOD AND DEVICE

BACKGROUND OF THE INVENTION

1. Field of the Invention

The present invention relates to a temperature control apparatus, a temperature control method and a device which can be applied to a large scale computer system, parallel computers, etc., for controlling the operating temperatures of devices such as semiconductor devices with temperature characteristics at their target temperatures so as to enable the devices at their desired operation speed.

2. Description of the Related Art

In general, devices such as semiconductor devices used for large scale computers, parallel computers, etc., have temperature characteristics in which their operation speed changes depending on the ambient temperature. Thus, in systems having the devices such as semiconductor devices, there have been known a lot of technologies for controlling the temperatures of the devices. For instance, Japanese Patent Application Laid-Open No. Hei 9-305268 discloses the following technique. That is, when a system operating in a proper environment detects a certain decrease in the temperature Tj of a semiconductor or a certain limited delay time thereof, the system is controlled to operate with the quantity of air supplied by a cooling fan reduced, as a result of which if there is no improvement, a heating-dedicated circuit is operated to restore Tj (chip temperature) or tpd (delay time) to a proper environmental value. In addition, when a certain rise of Tj, or a large value of tpd, or a certain increase in current supply is detected, the quantity of air supplied by the air cooling fan is controlled to increase. If there is no improvement even with these measures, a dummy operation is carried out to slow down the operation of the system. If not improved, at least one of the operation frequency and the supply voltage of the system is decreased, and thereafter the system is transferred to the normal operation at the time when Tj or tpd is restored to the proper value. According to such a technique, it is possible to bring out maximum performance under a proper environment from an information processing system, thereby permitting the system to operate with an optimal amount of power consumption.

Moreover, Japanese Patent Application Laid-Open No. 2000-36681 discloses another technique in which the value of a maximum amount of heat is prepared for each logic card by means of an LSI temperature reporting section based on the heat amount data of each LSI detected by a heat observation means which observes the temperature of each LSI to be cooled, and a maximum amount of heat for each logic card is totaled by a required cooling amount determination circuit whereby a maximum amount of heat (maximum temperature) within the housing of a information processing device is prepared and at the same time a necessary amount of cooling A within the housing is determined. As a consequence, the cooling control circuit receives the result of this determination and gives an on/off instruction to a cooling section based on the determination result, thus properly cooling the interior of the information processing device housing in accordance with the amount of heat generated therein. This technique makes it possible to decrease the amount of noise generated by and the amount of power consumed by the large cooling fans to be used for the large-scale information processing device.

Incidentally, devices such as semiconductor devices have respective temperature characteristics and involve variations in their operation speeds. Accordingly, even if the operating temperatures of the semiconductor devices are controlled without taking account of variations in the temperature characteristics and operation speeds thereof, the devices, when incorporated in a system and driven to run, might be subjected to racing and hence errors in operation particularly for the ones included in lots having large operating speeds. In addition, the operation speed of the entire system is limited by the elements or devices of a lot with the slowest switching speed. On the other hand, within the confines of the above-mentioned prior art, there has been proposed a temperature control apparatus intended to achieve, as one of its objects, low power consumption in controlling temperature such as during cooling. However, it is silent about temperature control based on such variations in the temperature characteristics and operation speeds, and hence in such prior art, it is still impossible to solved the above-mentioned problems resulting from variations in operation speeds.

SUMMARY OF THE INVENTION

The present invention has been made in view of the problems as referred to above, and has for its object to provide a temperature control apparatus, a temperature control method and a device in which in equipment such as information processing equipment constituted by devices such as semiconductor devices having temperature characteristics, the temperature of each device is controlled to a target operating temperature determined from a target operation speed thereof so as to alleviate the problem of variations in the operation speeds of the respective devices, thereby to enhance the operation speed of the entire system and reduce failures such as racing, etc., as well as the problem of manufacturing yield for improved reliability in operation, thus contributing to power savings in temperature control.

Bearing the above object in mind, according to a first aspect of the present invention, there is provided a temperature control apparatus comprising: a target operating temperature storage section for storing a target operating temperature of a device which is determined based on a predetermined target operation speed of the device; a temperature detection section for detecting the temperature of the device; a cooling or heating section for cooling or heating the device; and a control section for controlling the cooling or heating section based on a detected temperature of the device detected by the temperature detection section and the target operating temperature stored in the target operating temperature storage section.

With this arrangement, it is possible to control the temperature of the device such as a semiconductor device so as to make its operation speed to a predetermined value in accordance with its temperature characteristic. Accordingly, the operation speeds of a plurality of devices in the apparatus such as an information processing apparatus constituted by the plurality of devices can be made equal to one another. As a result, the manufacturing yield of such apparatuses can be improved and at the same time reliability in operation of the apparatus can be enhanced. In an embodiment of the present invention, control is effected in such a manner that the detected temperature becomes the target operating temperature.

According to a second aspect of the present invention, there is provided a temperature control apparatus comprising: a target operating temperature storage section for storing a target operating temperature of a predetermined device which is determined based on a predetermined target operation speed of at least the predetermined device among a plurality of devices; a temperature detection section for detecting the temperature of at least the predetermined device among the plurality of devices; a cooling or heating section for cooling or heating the plurality of devices; and a control section for controlling the cooling or heating section based on a detected temperature of the predetermined device detected by the temperature detection section and the target operating temperature of the predetermined device stored in the target operating temperature storage section.

In this case, it is possible to construct the plurality of devices such that the target operating temperatures thereof are made similar to one another.

In addition, it is preferable that the temperature detection section is arranged to detect the temperature of a device located in the vicinity of the center among the plurality of devices. Thus, it is possible to prevent the central device, which is easy to accumulate heat and hence the temperature of which is liable to rise high, can be prevented from arriving at a critical temperature. Incidentally, the operation speed of a semiconductor device varies remarkably with respect to a change in its temperature, so the above effect becomes remarkable if the device is constituted by such a semiconductor device. An LSI such as CMOS or an integrated circuit can be used as the semiconductor device.

With the above arrangement, the temperatures of the plurality of devices can be controlled by using the target operating temperature of a typical or representative one of the devices which is located for instance at the center of the plurality of devices. Thus, the number of the target operating temperature storage sections, the number of the temperature detection sections and the like can be reduced, thereby making it possible to simplify the entire construction.

Further, in the temperature control apparatus according to the present invention, the storage section may comprise a memory incorporated in the device. With such a configuration, the memory can be easily incorporated into the device such as a semiconductor device, and in addition, the target operating temperature of the device can be stored into that device, thus making it extremely easy to perform data management thereof. Preferably, in the temperature control apparatus of the present invention, the cooling or heating section may comprise a Peltier element or a heat pipe with which a heating or cooling unit is connected. By the use of the Peltier element and the heat pipe, it is possible to easily construct the cooling or heating section.

Moreover, in this case, when there are a plurality of devices which are cooled or heated by the heat pipe, those of the devices which are high in their cooling or heating level are arranged nearer to the cooling or heating unit than those devices which are low in their low cooling or heating level are. Such an arrangement serves to cool or heat the devices by means of a cooling or heating medium (for example, a cooling liquid) in an efficient manner.

According a third aspect of the present invention, there is provided a device with its operation speed determined by a temperature thereof, in which the temperature of the device is controlled to a target operating temperature corresponding to a predetermined target operation speed by a temperature control apparatus in order to make the device operate at the predetermined target operation speed, the device comprising a storage section for storing the target operating temperature as data which is given to the temperature control apparatus.

According to this device, it is easy to control the temperature of the device to the target operating temperature thereof, and it also becomes easy to manage the target operating temperature. Preferably, the device further comprises a temperature detection section for giving an actual temperature of the device to the temperature control apparatus, whereby it is not necessary to provide a temperature detection means separately from the device, thus making it easy to construct the temperature control apparatus.

According to a fourth aspect of the present invention, there is provided an apparatus having a device whose temperature is to be controlled, the apparatus comprising: a target operating temperature storage section for storing a target operating temperature of the device which is determined based on a predetermined target operation speed of the device; a temperature detection section for detecting the temperature of the device; a cooling or heating section for cooling or heating the device; and a control section for controlling the cooling or heating section based on a detected temperature of the device detected by the temperature detection section and the target operating temperature stored in the target operating temperature storage section.

With this arrangement, the temperature of the device such as a semiconductor device can be controlled in accordance with its temperature characteristic so that the operation speed of the device is made to a predetermined operation speed. As a result, the operation speeds of a plurality of devices in the apparatus such as an information processing apparatus constituted by the plurality of devices can be made equal to one another, and hence the reliability in operation of the apparatus can be improved.

According to a fifth aspect of the present invention, there is provided an apparatus having a plurality of devices whose temperatures are to be controlled, the apparatus comprising: a target operating temperature storage section for storing a target operating temperature of a predetermined device which is determined based on a predetermined target operation speed of at least the predetermined device among the plurality of devices; a temperature detection section for detecting the temperature of at least the predetermined device among the plurality of devices; a cooling or heating section for cooling or heating the plurality of devices; and a control section for controlling the cooling or heating section based on a detected temperature of the predetermined device detected by the temperature detection section and the target operating temperature of the predetermined device stored in the target operating temperature storage section.

According to a sixth aspect of the present invention, there is provided a temperature control method comprising: a first step of storing in advance a target operating temperature for operating a device at a predetermined target operation speed based on a relation between an operation speed and a temperature of the device; a second step of detecting the temperature of the device; and a third step of cooling or heating the device based on a detected temperature of the device detected in the second step and the target operating temperature stored in the first step.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. In the following, description will be made taking, as a device, an example of a semiconductor device such as an LSI.

Embodiment 1.

Figure 1:
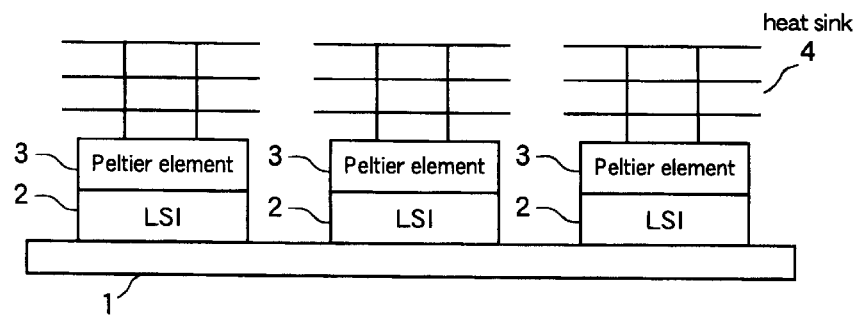
FIG. 1 is a schematic constructional view illustrating a first embodiment of the present invention.
Figure 2:
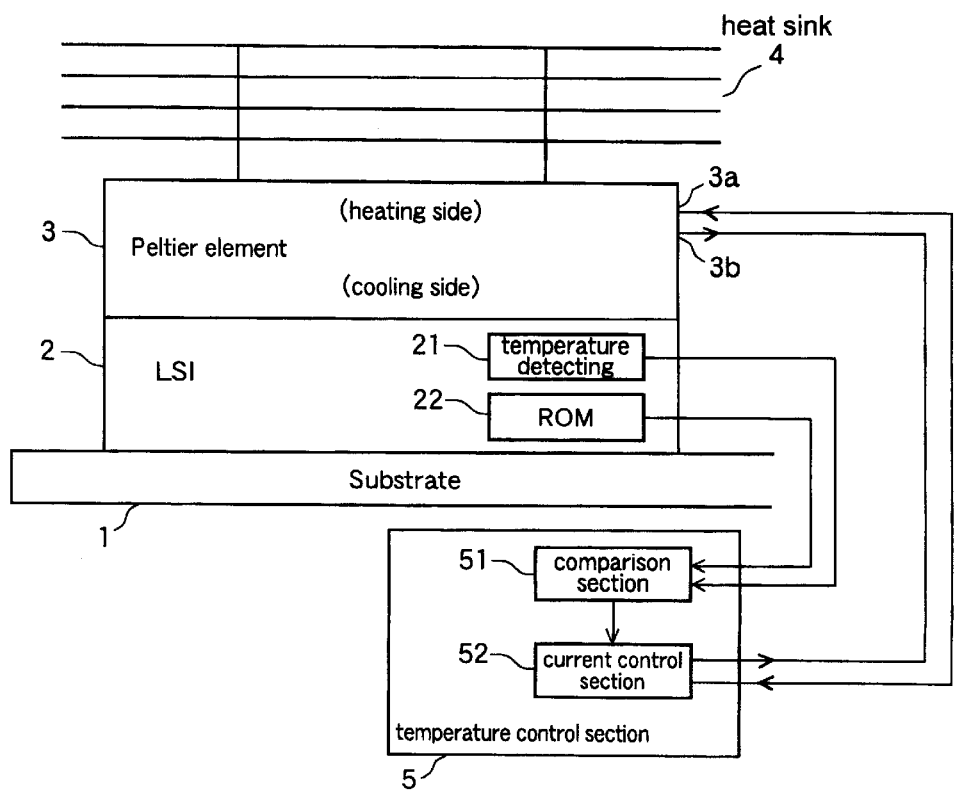
FIG. 2 is a partially enlarged view of FIG. 1.
Figure 3:
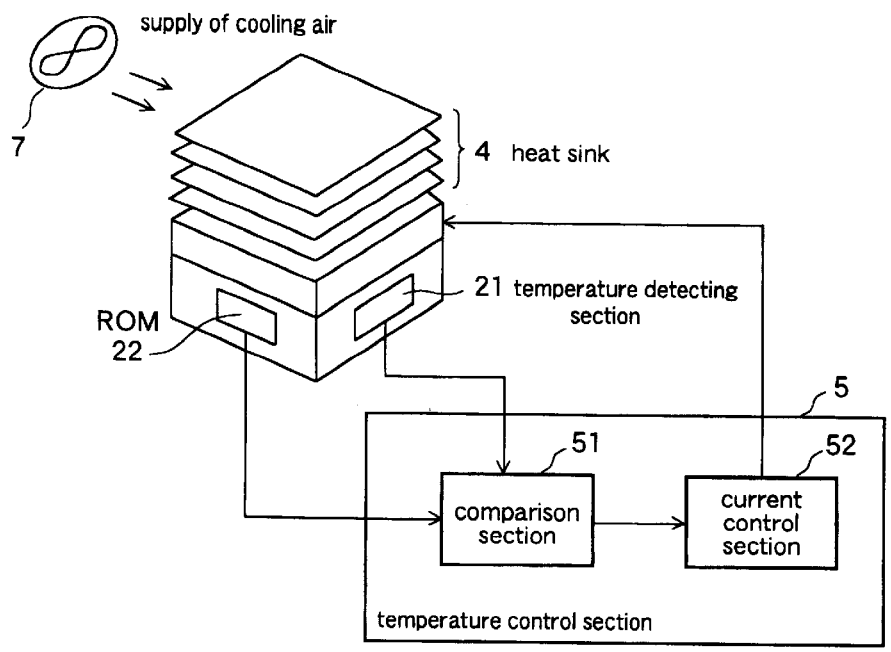
FIG. 3 is a perspective view of FIG. 2.

As shown in FIGS. 1 and 2, a plurality of LSIs 2 are mounted on a substrate 1 and each include therein a temperature detection section in the form of a temperature detecting section 21 and a target operating temperature storage means in the form a storage section such as, for example, a ROM 22. Also, a Peltier element 3 is provided on an upper surface of each LSI 2. Each Peltier element 3 has a cooling side for absorbing heat when a current flows therethrough, and a heating side opposite the cooling side arranged in such a manner that the cooling side is in intimate contact with the upper surface of a corresponding LSI 2, and its heating side is in contact with a heat sink 4. Each Peltier element 3 is provided at its appropriate portions with terminals 3a, 3b which are connected with a temperature control section 5. In addition, each heat sink 4 is cooled by a cooling fan 7 as illustrated in FIG. 3. Here, note that the temperature detecting section 21 can be constituted by a transistor thermometer, a thermistor thermometer or the like which has a sensor (transducer) for converting a temperature parameter into a corresponding electric parameter. However, it is particularly preferable to employ a transistor thermometer as the sensor incorporated in the LSI.

The temperature control section 5 controls current to be thrown through the Peltier element 3 in such a manner that the temperature (current or voltage) detected by the temperature detecting section 21 in the LSI 2 is equal to a target operating temperature (a predetermined current or voltage) stored in the ROM 22. That is, when the detection temperature of the LSI 2 rises above the target operating temperature, the current supplied to the Peltier element 3 is increased, and in the opposite case, the current is decreased. The temperature control section 5 includes a comparison section 51 which makes a comparison between the detected temperature and the target operating temperature, and a current control section 52 which controls the current to be supplied to the Peltier element 3 based on the comparison result of the comparison section 51. For instance, the current control section 52 controls the current supplied to the Peltier element 3 so that the comparison result of the comparison section 51 becomes zero.

Figure 4:
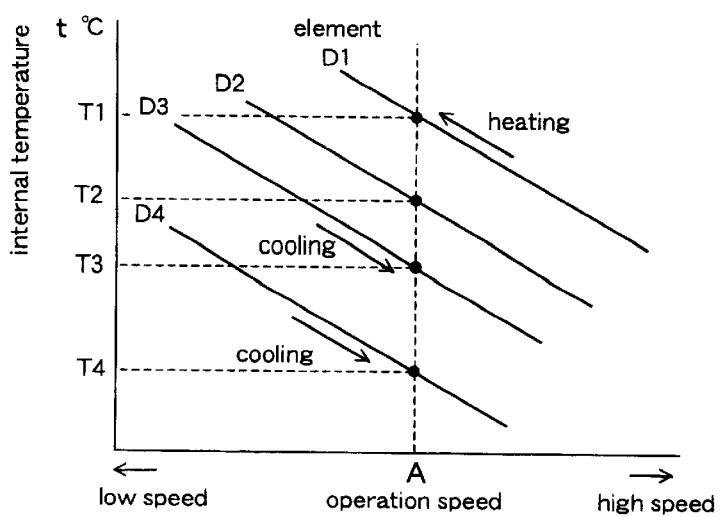
FIG. 4 is a view illustrating the temperature characteristic of a semiconductor device according to the first embodiment of the present invention.

FIG. 4 is a view illustrating the relation between the temperatures of the plurality of LSIs and the operation speeds thereof. The semiconductor devices such as LSIs (elements) have such temperature characteristics that as the operating temperatures (internal temperatures) thereof rise, the operation speeds thereof decrease, whereas as the temperatures fall, the operation speeds thereof go up. In a device having a multitude of LSIs mounted thereon, if there are variations in the operation speeds of the LSIs, racing will be developed, thus causing the LSIs to malfunction. As a result, the temperature control section 5 controls the temperature of each LSI so that the operation speeds of the respective LSIs are made equal to one another, thus preventing racing from being generated.

For example, the operation speeds of the respective LSIs or elements are set to a prescribed value A as depicted in FIG. 4. The temperatures (T1 through T4) for these elements corresponding to this operation speed A are measured at the time of manufacture of the respective devices, and are stored in the ROM 22 as target operating temperatures. In FIG. 4, the target operating temperatures stored in the ROM 22 lower in the order of the elements (semiconductor devices) D1 through D4. That is, the level of cooling is larger in the element D2 (target operating temperature T2) than in the element D1 (target operating temperature T4), and is larger in the element D3 (target operating temperature T3) than in the element D2, and is larger in the element D4 (target operating temperature T4) than in the element D3. In some cases, under such a temperature environment in which the ambient temperature is equal to the target operating temperature (T2) of the element D2 in FIG. 4 for example, the elements D3, D4 are cooled while the element D1 is heated with the temperature of the element D2 being maintained.

Embodiment 2.

Figure 5:
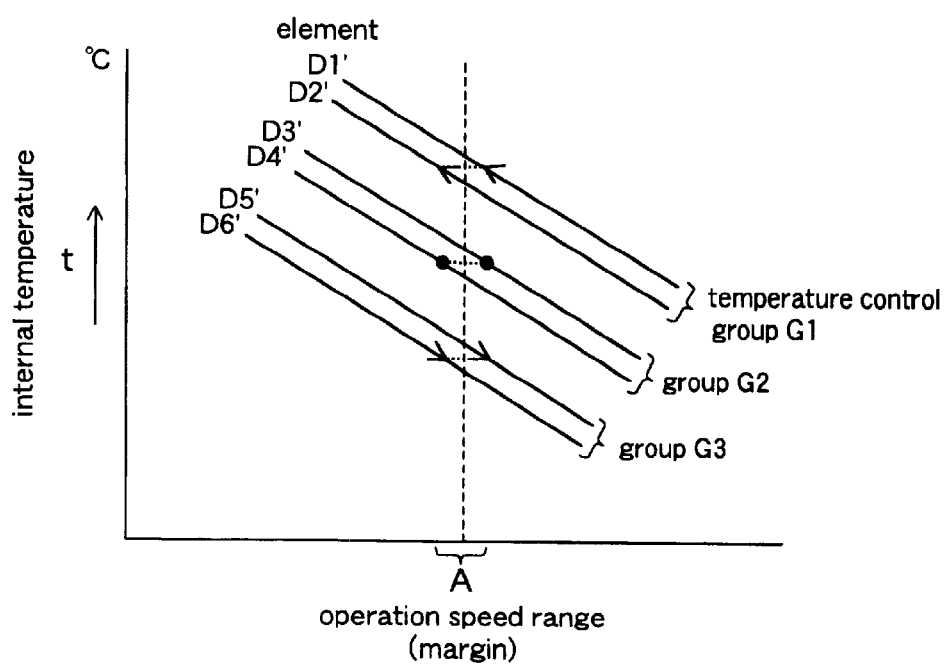
FIG. 5 is a view illustrating the temperature characteristic of a semiconductor device according to a second embodiment of the present invention.

In the above-mentioned first embodiment, there has been illustrated an example in which the target operating temperatures for the respective LSIs 2 are stored and the respective LSIs 2 are controlled to their target operating temperatures, respectively, by means of the Peltier elements, but in cases where many semiconductor devices are used, there are many LSIs which have similar temperature characteristics and hence similar target operating temperatures corresponding to a predetermined target operation speed. FIG. 5 illustrates the temperature characteristics of a plurality of such semiconductor devices. According to FIG. 5, a pair of elements (semiconductor devices) D1' and D2', and another pair of elements D3' and D4', and a further pair of elements D5' and D6' have mutually similar temperature characteristics in each pair. Therefore, in this case, by making the target operating temperatures of the elements having mutually similar temperature characteristics be the same value, it is possible to render the operation speeds of those elements substantially equal to each other (within a range of operation speeds with a margin).

Figure 6:
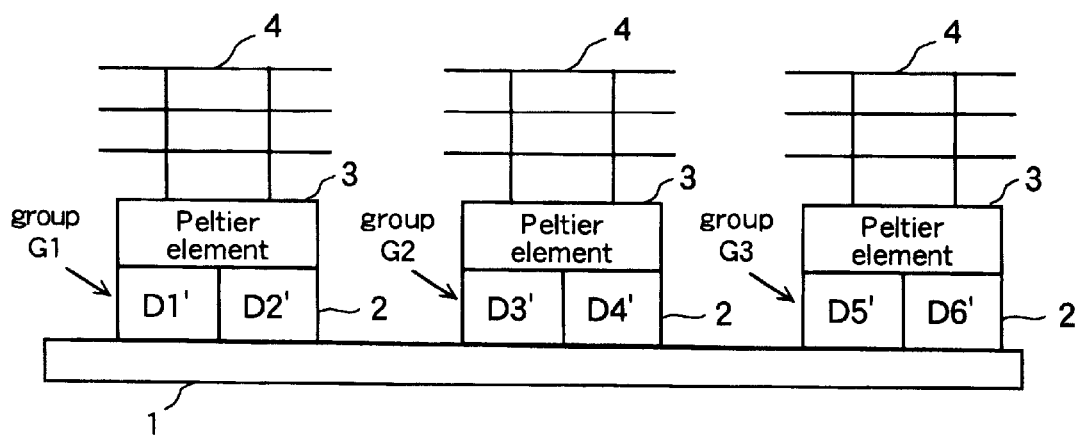
FIG. 6 is a schematic constructional view illustrating the second embodiment of the present invention.

Thus, as illustrated in FIG. 6 for example, a plurality of LSIs (e.g., two pieces for instance) having mutually similar temperature characteristics may be grouped so that temperature control can be performed for each of groups G1 through G3. In this case, as compared with the first embodiment, it is only necessary to provide component elements required for temperature control such as, for example, the temperature detecting section 21, the current control section 22, the ROM 22 storing the target operating temperature, one for each group. Therefore, it is possible to reduce the number of component elements required, thus contributing to simplification of the construction and cost reduction as well.

Embodiment 3.

Figure 7:
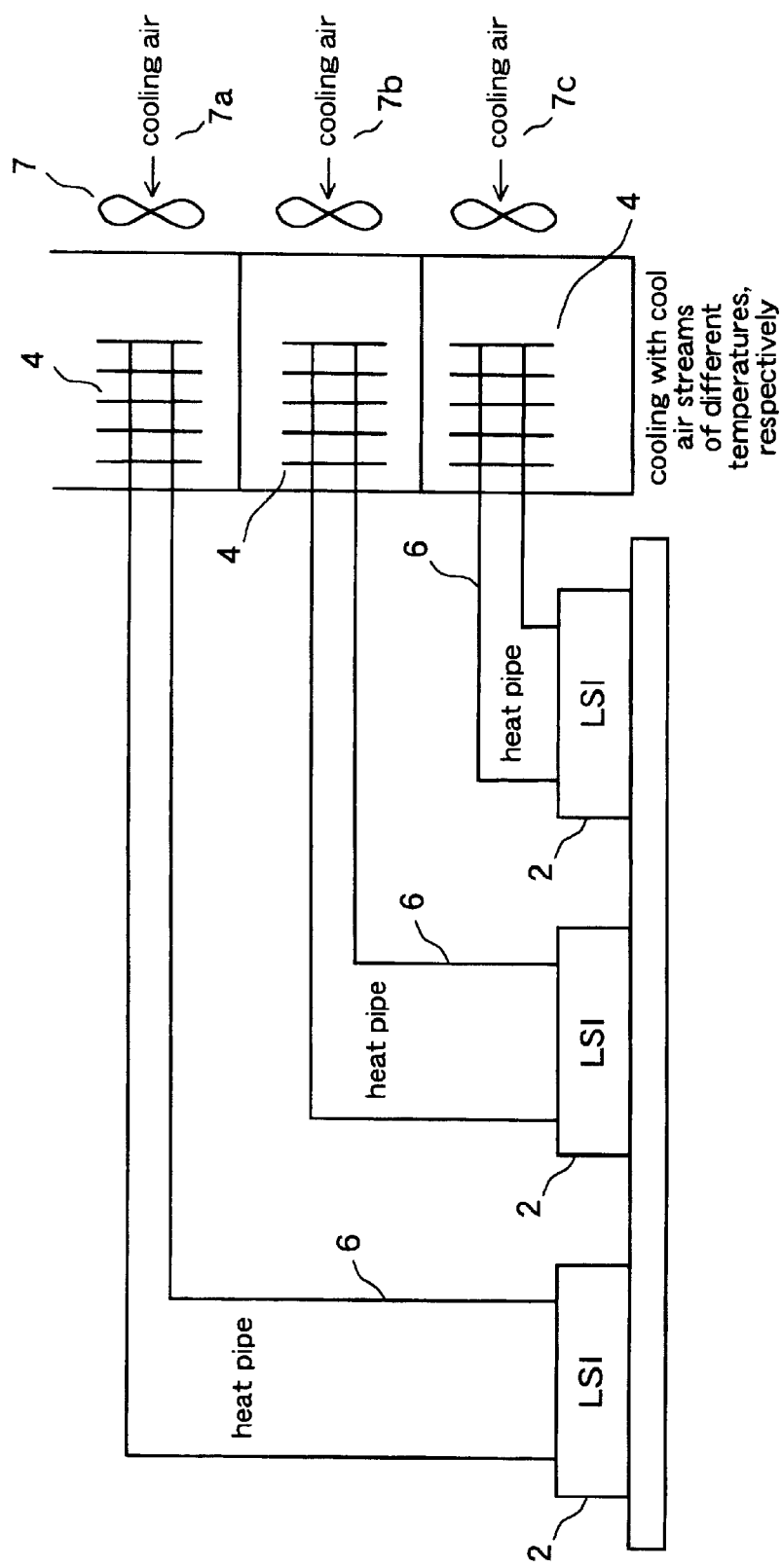
FIG. 7 is a schematic constructional view illustrating a third embodiment of the present invention.
Figure 8:
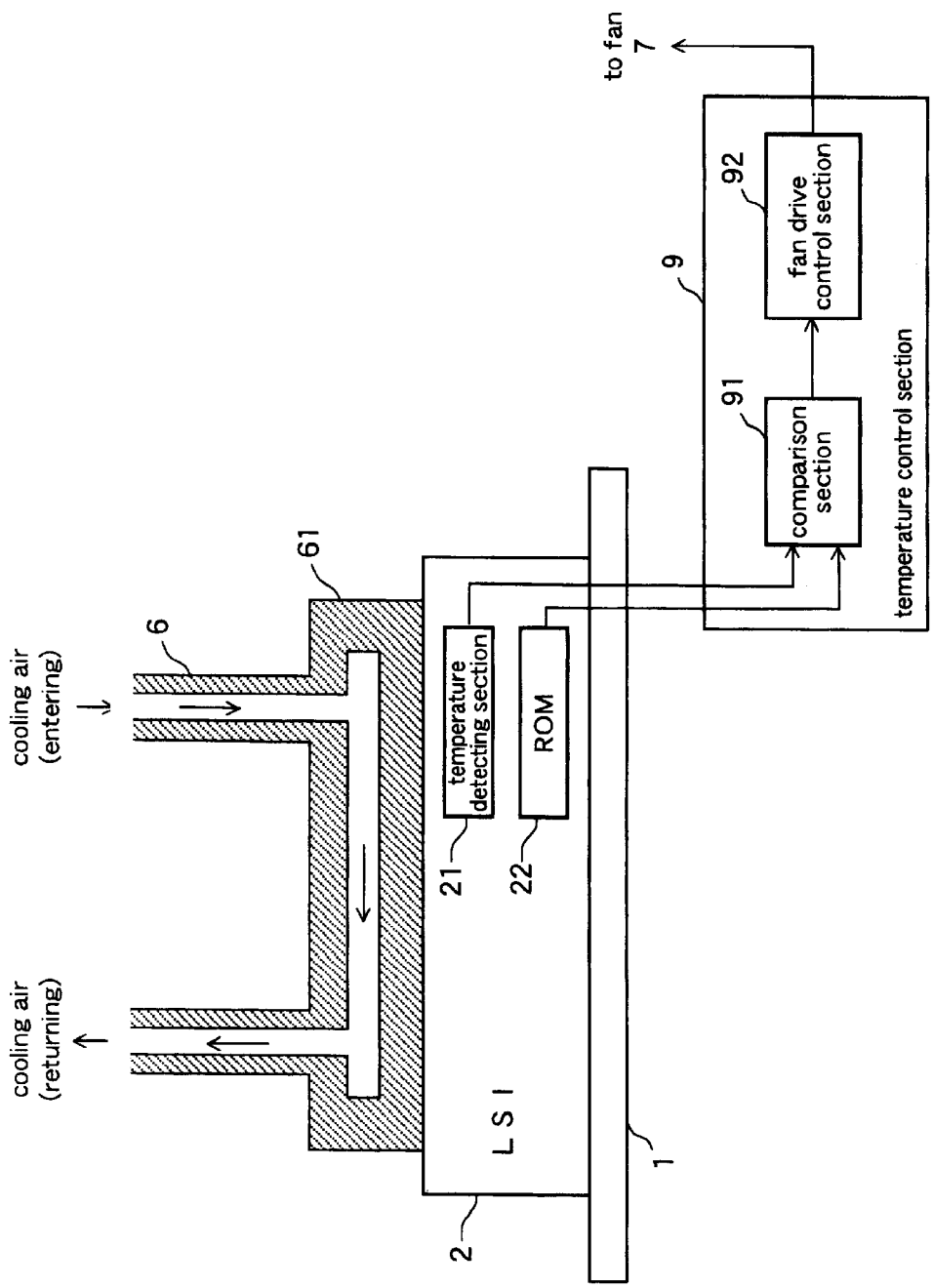
FIG. 8 is a partially enlarged view of FIG. 7.
Figure 9:
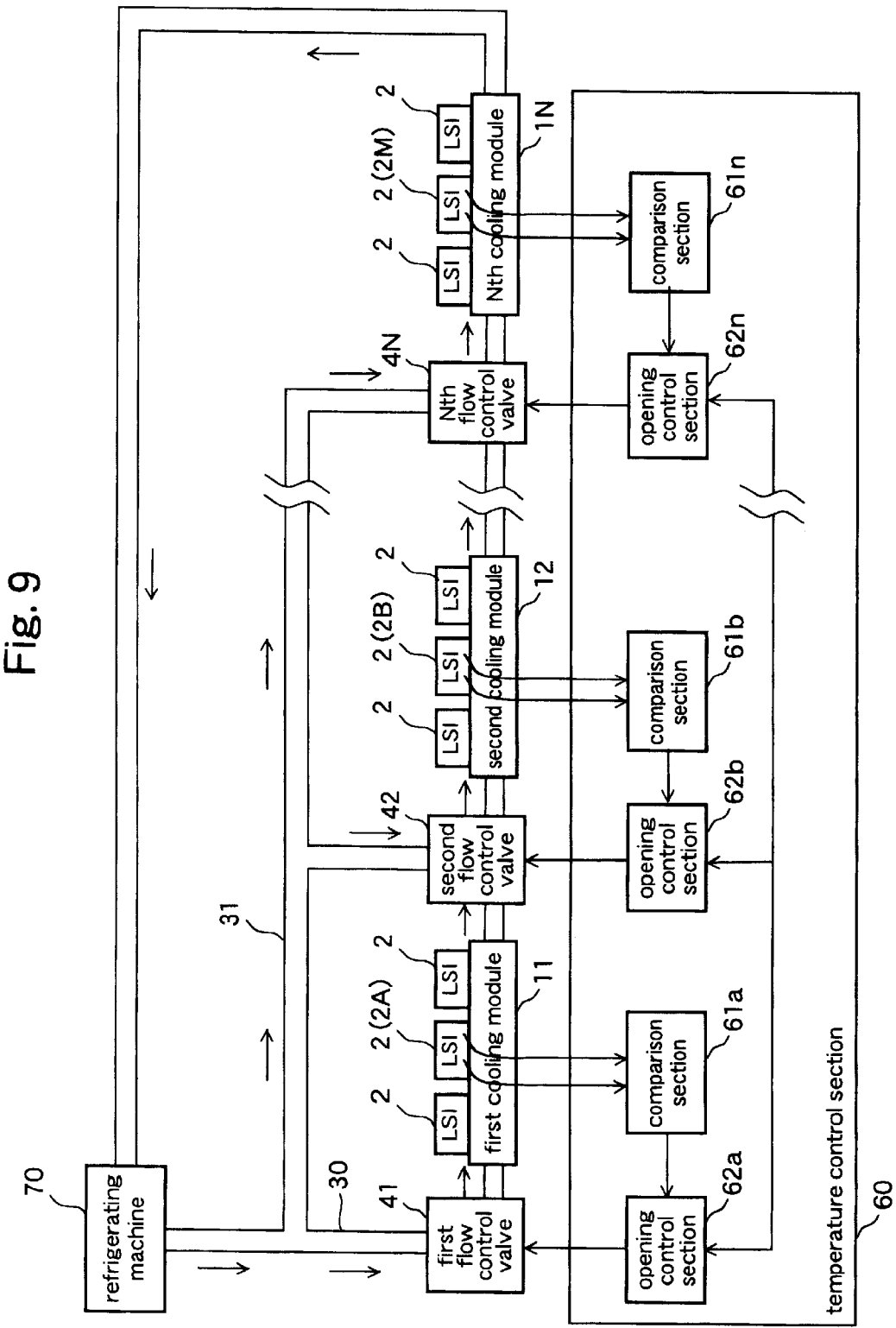
FIG. 9 is a schematic constructional view illustrating a fourth embodiment of the present invention.

Although in the above-mentioned first embodiment, reference has been made to the case in which Peltier elements are used as cooling or heating means, heat pipes may be used for temperature control in place of the Peltier elements. FIG. 7 and FIG. 8 illustrate exemplary schematic configurations using heat pipes for temperature control. In this embodiment, heat pipes 6 are connected at one ends thereof directly or through heat conduction members 61 with an upper surface of each LSI 2 for heating them or absorbing heat generated there. The heat pipes 6 are connected at the other ends thereof with corresponding heat sinks 4 for circulation of heat (i.e., heat radiation and heat absorption). In this case, too, each LSI 2 is provided with a temperature detecting section 21 for detecting the temperature thereof, and a storage member such as, for example, a ROM 22 in which target operating temperatures are stored. Provision is also made for cooling fans 7 one for each heat sink 4, which are each driven to control the detected temperature of the corresponding temperature detecting section 21 to a target operating temperature.

A temperature control section 9 illustrated in FIG. 8 includes a comparison section 91 which compares a detected temperature from a corresponding temperature detecting section 21 with a target operating temperature from a corresponding ROM 22, and a fan drive control section 92 which drives each cooling fan 7 in such a manner that the comparison result of the comparison section 91 becomes zero. Here, note that in FIG. 7, the plurality of heat sinks 4 are connected with the corresponding heat pipes from the LSIs having different target operating temperatures, respectively, and cooled by cooling air streams (cooling airs 7a through 7c) of different temperatures, respectively. The LSIs with lower target operating temperatures are supplied with cooling air whose temperature is lower than the temperature of cooling air supplied to those LSIs which have higher target operating temperatures.

Here, it is to be note that as a modification of this third embodiment, a plurality of LSIs may be divided into a plurality of groups each including LSIs having mutually similar target operating temperatures, so that the LSIs in each group can be controlled to a representative target operating temperature of each group. Such a modification will be described in more detail in the following fourth embodiment of the present invention.

Embodiment 4.

In a fourth embodiment of the present invention, a central one (2A, 2B,. . . 2M), located centrally, of a plurality of (three in the illustrated example) LSIs mounted on each of cooling modules 11 through 1N is provided with a ROM which stores target operating temperatures and a temperature detecting section (similar to FIG. 8). The temperature control section 60 includes comparison sections 61a through 61n which make comparisons between these temperatures, and valve opening control sections 62a through 62n which adjust the opening angles of flow control valves 41 through 4N based on the comparison results of the comparison sections 61a through 61n to control the flow rates through the flow control valves, thus controlling the opening angles of valves which control the temperatures of the LSIs mounted on the cooling modules.

Now, reference will be made to the operation of the apparatus as constructed above. On the part of the first cooling module 11, the comparison section 61a compares the target operating temperature of the LSI 2A with a detected temperature. When the detected temperature is higher than the target operating temperature, the valve opening control section 62a controls the first flow control valve 41 so as to increase the flow rate of a cooling medium or liquid. On the other hand, when the detected temperature is lower than the target operating temperature, the first flow control valve 41 is controlled to decrease the flow rate of the cooling liquid. On the part of the second cooling module 12, the comparison section 61b makes a comparison between the target operating temperature of the LSI 2B and the detected temperature. When the detected temperature is higher than the target operating temperature, the valve opening control section 62b controls the opening angle of the second flow control valve 42 so as to lower the detected temperature.

Figure 10:
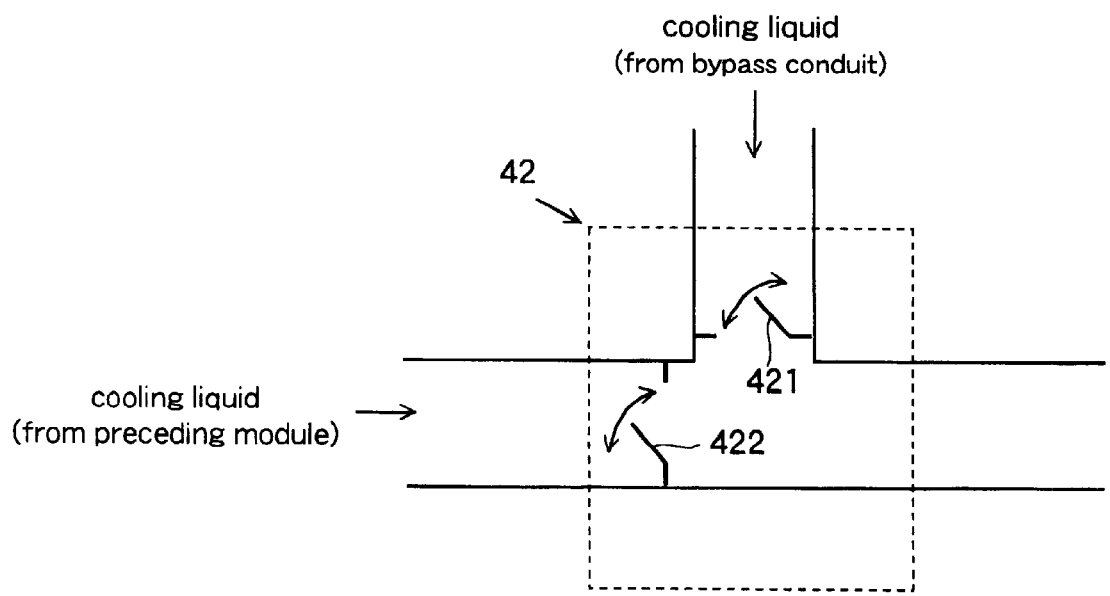
FIG. 10 is a view illustrating the configuration of a second flow control valve.

The second flow control valve 42 has a bypass side valve body 421 provided in a bypass conduit 31 side and a main circulation conduit side valve body 422 provided in a main circulation conduit 30 side, as illustrated in FIG. 10. When the detected temperature is higher than the target operating temperature, the valve opening control section 62b greatly opens the opening angle of the bypass side valve body 421 so that an inflow from the bypass conduit 31 to main circulation conduit 30 increases. This is because the cooling liquid sent from the main circulation conduit 30 absorbs heat and rises in its temperature while passing through the first cooling module 11, whereby the cooling efficiency can be improved by taking the cooling liquid from the bypass conduit 31 side. On the other hand, when the level of cooling is low, or when the detected temperature is low enough without any need for temperature decrease, or when heating is required, the bypass side valve body 421 is controlled to a small opening angle, and the temperature control is mainly effected by the cooling liquid sent from the main circulation conduit 30 side.

Here, note that the main circulation conduit side valve body 422 of the second flow control valve 42 has a relation with the opening angle of the first flow control valve 41. For instance, when the necessity of cooling the first cooling module 11 is low, the opening angle of the second flow control valve 42 is reduced along with the opening angle of the first flow control valve 41. On the other hand, when the necessity of cooling the first cooling module 11 is high, the opening angle of the second flow control valve 42 is increased together with the opening angle of the first flow control valve 41. Moreover, when the necessity of cooling the second cooling module 12 is high while the necessity of cooling the first cooling module 11 is low, the opening angle of the main circulation conduit side valve body 422 is reduced and at the same time the opening angle of the bypass side valve body 421 is increased. Hereinafter, the same control is effected for the third and following cooling modules, and hence a description thereof is omitted here.

In this fourth embodiment, the LSIs mounted on the first cooling module 11 is selected such that the target operating temperature of the central LSI (2A, etc.) mounted on the first cooling module 11 is lower more than the target operating temperature of the central LSI (2B, etc.) mounted on the second cooling module 12. The reason for this arrangement is that the level of cooling for these LSIs (2A, etc.)is large and hence the efficiency of cooling can be improved by arranging these LSIs (2A, etc.) at locations near a refrigerating machine 70 (cooling device) in the main circulation conduit 30, whereas the LSIs (2B, etc.), each of which has a high target operating temperature and a limited level of cooling, are mounted on remote cooling modules (the second and thereafter cooling modules) away from the refrigerating machine 70 in the main circulation conduit 30 since these LSIs (2B, etc.) need not be cooled so much in comparison with the ones having low target operating temperatures.

In addition, in this embodiment, each temperature detecting section is mounted on the central one (2A, 2B, etc.), located centrally, of the plurality of LSIs mounted on each cooling module for detecting the temperature thereof. The reason for this arrangement is considered as follows: the one located centrally among the plurality of LSIs is easy to accumulate heat and accordingly might rise to the highest temperature.

The temperature control apparatus and the temperature control method as described in detail in the aforementioned respective embodiments are effective for preventing the generation of racing when used with a large scale computer system, a parallel computer system, etc. Moreover, the devices can be cooled or heated individually in a unit including a desired number of devices as necessary, and hence it is possible to achieve power savings in temperature control. Incidentally, note that in the above-mentioned embodiments, for the case of controlling the temperatures of the devices in a groupwise manner, temperature control has been shown as being effected on groups each comprising two or three devices. However, it is needless to say that the present invention is not limited to the groups each comprising these numbers of devices. In other words, it is essential to perform groupwise temperature control on each set of devices which are similar in their temperature characteristics, and in this case, the number of devices to be groupwise controlled to the same temperature is not limited but optional as necessary. Furthermore, not only a single value but also a plurality of values according to the temperature characteristics of the devices may be stored as target operating temperatures, and a proper one or ones may be optionally selected among these plurality of target operating temperature values based on a temperature environment, a service environment, etc., in which the devices are used.

As detailed in the foregoing, according to the present invention, the following advantages are obtained by controlling the operating temperature of each device to a target operating temperature which is determined based on a predetermined target operation speed of the device. That is, in an apparatus such as information processing equipment comprising devices such as semiconductor devices having temperature characteristics, it is possible to alleviate the problem of variations in the operation speeds of the devices, thereby improving the operation speed of the entire system. In addition, failures such as racing, etc., as well as the problem of manufacturing yield can be reduced, and hence the reliability in operation can be improved. As a result, a temperature control apparatus, a temperature control method and a device can be provided which serve to contribute to power reduction in temperature control.

While the invention has been described in terms of preferred embodiments, those skilled in the art will recognize that the invention can be practiced with modifications within the spirit and scope of the appended claims.

What is claimed is:

1. A temperature control apparatus comprising:
   a target operating temperature storage section for storing a target operating temperature of a device which is determined based on a predetermined target operation speed of said device;
   a temperature detection section for detecting the temperature of said device;
   a cooling or heating section for cooling or heating said device; and
   a control section for controlling said cooling or heating section based on a detected temperature of said device detected by said temperature detection section and said target operating temperature stored in said target operating temperature storage section.

2. A temperature control apparatus comprising:
   a target operating temperature storage section for storing a target operating temperature of a predetermined device which is determined based on a predetermined target operation speed of at least said predetermined device among a plurality of devices;
   a temperature detection section for detecting the temperature of at least said predetermined device among said plurality of devices;
   a cooling or heating section for cooling or heating said plurality of devices; and
   a control section for controlling said cooling or heating section based on a detected temperature of said predetermined device detected by said temperature detection section and said target operating temperature of said predetermined device stored in said target operating temperature storage section.

3. The temperature control apparatus according to claim 2, wherein the target operating temperatures of said plurality of devices are mutually similar to one another.

4. The temperature control apparatus according to claim 2, wherein said temperature detection section detects the temperature of a device located in the vicinity of the center of said plurality of devices.

5. The temperature control apparatus according to claim 1, wherein said device comprises a semiconductor device.

6. The temperature control apparatus according to claim 5, wherein said device comprises an LSI.

7. The temperature control apparatus according to claim 5, wherein said target operating temperature storage section comprises a memory in said device.

8. The temperature control apparatus according to claim 1, wherein said cooling or heating section comprises a Peltier element.

9. The temperature control apparatus according to claim 1, wherein said cooling or heating section comprises a heat pipe connected with a cooling or heating unit.

10. The temperature control apparatus according to claim 9, wherein in cases where there are a plurality of devices which are cooled or heated by said heat pipe, those of said devices which are high in their cooling or heating level are arranged nearer to said cooling or heating unit than those devices which are low in their low cooling or heating level are.

11. A device with its operation speed determined by a temperature thereof, in which the temperature of said device is controlled to a target operating temperature corresponding to a predetermined target operation speed by a temperature control apparatus in order to make said device operate at said predetermined target operation speed, said device comprising a storage section for storing said target operating temperature as data which is given to said temperature control apparatus.

12. The device according to claim 11, further comprising a temperature detection section for giving an actual temperature of said device to said temperature control apparatus.

13. An apparatus having a device whose temperature is to be controlled, said apparatus comprising:
- a target operating temperature storage section for storing a target operating temperature of said device which is determined based on a predetermined target operation speed of said device;
- a temperature detection section for detecting the temperature of said device; a cooling or heating section for cooling or heating said device; and
- a control section for controlling said cooling or heating section based on a detected temperature of said device detected by said temperature detection section and said target operating temperature stored in said target operating temperature storage section.

14. An apparatus having a plurality of devices whose temperatures are to be controlled, said apparatus comprising:
- a target operating temperature storage section for storing a target operating temperature of a predetermined device which is determined based on a predetermined target operation speed of at least said predetermined device among said plurality of devices;
- a temperature detection section for detecting the temperature of at least said predetermined device among said plurality of devices;
- a cooling or heating section for cooling or heating said plurality of devices; and
- a control section for controlling said cooling or heating section based on a detected temperature of said predetermined device detected by said temperature detection section and said target operating temperature of said predetermined device stored in said target operating temperature storage section.

15. A temperature control method comprising:
- a first step of storing in advance a target operating temperature for operating a device at a predetermined target operation speed based on a relation between an operation speed and a temperature of said device;
- a second step of detecting the temperature of said device; and
- a third step of cooling or heating said device based on a detected temperature of said device detected in said second step and said target operating temperature stored in said first step.

* * * * *

UNITED STATES PATENT AND TRADEMARK OFFICE
CERTIFICATE OF CORRECTION

PATENT NO. : 6,512,209 B1
DATED : January 28, 2003
INVENTOR(S) : Shinsuke Yano

It is certified that error appears in the above-identified patent and that said Letters Patent is hereby corrected as shown below:

<u>Title page,</u>
Item [30], please replace the Foreign Application Priority Data as follows:
-- July 9, 2001 --

Signed and Sealed this

Thirteenth Day of January, 2004

JON W. DUDAS
*Acting Director of the United States Patent and Trademark Office*